United States Patent
Morris

(10) Patent No.: US 9,663,702 B2
(45) Date of Patent: May 30, 2017

(54) INVERT EMULSION TRANSITION FLUID CONTAINING CALCIUM ALUMINATE CEMENT

(75) Inventor: Kay A. Morris, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 243 days.

(21) Appl. No.: 13/599,978

(22) Filed: Aug. 30, 2012

(65) Prior Publication Data

US 2014/0060835 A1  Mar. 6, 2014

(51) Int. Cl.
| | |
|---|---|
| *C09K 8/46* | (2006.01) |
| *C04B 28/06* | (2006.01) |
| *C04B 28/02* | (2006.01) |
| *C09K 8/40* | (2006.01) |
| *C09K 8/42* | (2006.01) |

(52) U.S. Cl.
CPC ............... *C09K 8/46* (2013.01); *C04B 28/02* (2013.01); *C04B 28/06* (2013.01); *C09K 8/40* (2013.01); *C09K 8/424* (2013.01); *Y02W 30/92* (2015.05)

(58) Field of Classification Search
CPC ...................................................... C09K 8/424
See application file for complete search history.

(56) References Cited

U.S. PATENT DOCUMENTS

| | | | | |
|---|---|---|---|---|
| 3,850,248 | A | * | 11/1974 | Carney ................. C09K 8/424 166/291 |
| 4,700,780 | A | * | 10/1987 | Brothers ....................... 166/293 |
| 5,020,598 | A | | 6/1991 | Cowan et al. |
| 5,058,679 | A | | 10/1991 | Hale et al. |
| 5,295,543 | A | | 3/1994 | Terry et al. |
| 5,305,831 | A | | 4/1994 | Nahm |
| 5,327,968 | A | | 7/1994 | Onan et al. |
| 5,333,690 | A | * | 8/1994 | Nahm et al. ................. 166/291 |
| 5,383,521 | A | | 1/1995 | Onan et al. |
| 5,458,195 | A | | 10/1995 | Totten et al. |
| 5,458,197 | A | * | 10/1995 | Chan ............................ 166/304 |
| 5,569,324 | A | | 10/1996 | Totten et al. |
| 5,585,333 | A | | 12/1996 | Dahl et al. |

(Continued)

FOREIGN PATENT DOCUMENTS

EP  2457974 A1  5/2012

OTHER PUBLICATIONS

Product Data Sheet, SECAR® 51, Kerneos Inc., published Aug. 24, 2006.*

(Continued)

*Primary Examiner* — Angela M Di-Trani
*Assistant Examiner* — Andrew H Sue-Ako
(74) *Attorney, Agent, or Firm* — McGuireWoods LLP

(57) ABSTRACT

A transition fluid comprises: a hydrocarbon liquid, wherein the hydrocarbon liquid is the external phase of the transition fluid; an aqueous liquid, wherein the aqueous liquid is the internal phase of the transition fluid and wherein the aqueous liquid comprises a water-soluble salt; and a calcium aluminate cement. A method of cementing in a subterranean formation comprises: introducing the transition fluid into the subterranean formation; and introducing a cement composition into the subterranean formation, wherein the step of introducing the cement composition is performed after the step of introducing the transition fluid and wherein the cement composition comprises cement and water.

18 Claims, 2 Drawing Sheets

(56) References Cited

U.S. PATENT DOCUMENTS

| | | | |
|---|---|---|---|
| 5,711,383 | A | 1/1998 | Terry et al. |
| 5,900,053 | A | 5/1999 | Brothers et al. |
| 6,143,069 | A | 11/2000 | Brothers et al. |
| 6,244,343 | B1 | 6/2001 | Brothers et al. |
| 6,332,921 | B1 | 12/2001 | Brothers et al. |
| 6,488,763 | B2 | 12/2002 | Brothers et al. |
| 6,722,433 | B2 | 4/2004 | Brothers et al. |
| 6,796,378 | B2 | 9/2004 | Reddy et al. |
| 6,835,243 | B2 | 12/2004 | Brothers et al. |
| 6,846,357 | B2 | 1/2005 | Reddy et al. |
| 6,887,832 | B2 | 5/2005 | Kirsner et al. |
| 7,086,466 | B2 | 8/2006 | Roddy |
| 7,093,663 | B1* | 8/2006 | Bader ............... 166/371 |
| 7,111,684 | B2* | 9/2006 | Brothers et al. ............. 166/294 |
| 7,147,067 | B2 | 12/2006 | Getzlaf et al. |
| 7,198,104 | B2 | 4/2007 | Griffith et al. |
| 7,199,086 | B1 | 4/2007 | Roddy et al. |
| 7,204,310 | B1 | 4/2007 | Roddy et al. |
| 7,213,647 | B2 | 5/2007 | Brothers et al. |
| 7,259,130 | B2 | 8/2007 | Griffith et al. |
| 7,278,485 | B2 | 10/2007 | Kirsner et al. |
| 7,284,608 | B2 | 10/2007 | Reddy et al. |
| 7,284,609 | B2 | 10/2007 | Roddy et al. |
| 7,337,842 | B2 | 3/2008 | Roddy et al. |
| 7,338,923 | B2 | 3/2008 | Roddy et al. |
| 7,341,985 | B2 | 3/2008 | Lal et al. |
| 7,381,263 | B2 | 6/2008 | Roddy et al. |
| 7,448,450 | B2 | 11/2008 | Luke et al. |
| 7,456,135 | B2 | 11/2008 | Kirsner et al. |
| 7,462,580 | B2 | 12/2008 | Kirsner et al. |
| 7,488,704 | B2 | 2/2009 | Kirsner et al. |
| 7,534,743 | B2 | 5/2009 | Kirsner et al. |
| 7,547,663 | B2 | 6/2009 | Kirsner et al. |
| 7,645,723 | B2 | 1/2010 | Kirsner et al. |
| 7,696,131 | B2 | 4/2010 | Oyler et al. |
| 7,863,224 | B2 | 1/2011 | Keys et al. |
| 2005/0022990 | A1 | 2/2005 | Chatterji et al. |
| 2006/0054320 | A1 | 3/2006 | Brothers et al. |
| 2006/0054321 | A1* | 3/2006 | Szymanski ............ C04B 28/02 166/293 |
| 2006/0272815 | A1* | 12/2006 | Jones et al. ................... 166/278 |
| 2008/0110619 | A1 | 5/2008 | Roddy |
| 2011/0017452 | A1 | 1/2011 | Benkley et al. |
| 2011/0067856 | A1* | 3/2011 | Kohr ............................. 166/246 |
| 2012/0241155 | A1* | 9/2012 | Ali et al. ...................... 166/285 |

OTHER PUBLICATIONS

Harmon, et al., Use of Oil-Cement Slurries for Decreasing Water Production, Dowell Inc., Apr. 1955, 451-457.
Cowan, et al., Conversion of Drilling Fluids to Cements With Blast Furnace Slag: Performance Properties and Applications for Well Cementing, SPE, 24575, Oct. 1992, 277-288.
Product Data Sheet, Diesel-Oil Cement, Halliburton energy Services, Inc.
Product Data Sheet, Encore High-Performance, Halliburton energy Services, Inc.
Product Data Sheet, Encore Base, Halliburton energy Services, Inc.
Product Data Sheet, Baroid Alkane, Halliburton energy Services, Inc.
Product Data Sheet, Petrofree, Halliburton energy Services, Inc.
Product Data Sheet, Accolade Base, Halliburton energy Services, Inc.
Product Data Sheet, ThermaLock Cement, Halliburton energy Services, Inc.
Product Data Sheet, Halad-344, Halliburton energy Services, Inc.
Product Data Sheet, Halad-413, Halliburton energy Services, Inc.
Product Data Sheet, HR-4 Cement Retarder, Halliburton energy Services, Inc.
Product Data Sheet, HR-5, Halliburton energy Services, Inc.
Product Data Sheet, HR-12, Halliburton energy Services, Inc.
Product Data Sheet, HR-25, Halliburton energy Services, Inc.
Product Data Sheet, SCR-100 Cement Retarder, Halliburton energy Services, Inc.
Product Data Sheet, CFR-3 and CFR-3L Dispersant, Halliburton energy Services, Inc.
Product Data Sheet, CFR-6, Halliburton energy Services, Inc.
Product Data Sheet, SSA-1, Halliburton energy Services, Inc.
Product Data Sheet, SSA-2, Halliburton energy Services, Inc.
Product Data Sheet, Spherelite, Halliburton energy Services, Inc.
Product Data Sheet, Hi-Dense, Halliburton energy Services, Inc.
Product Data Sheet, Micromax, Halliburton energy Services, Inc.
Product Data Sheet, The Family of WellLife Additives, Halliburton energy Services, Inc.
Canadian Intellectual Property Office, Requisition by the Examiner in Accordance with Subsection 30(2) of the Patent Rules, Canadian Application No. 2,877,689, mailed Feb. 12, 2016.
PCT International Preliminary Report on Patentability (IPRP), International application No. PCT/US2013/042395, mailed Mar. 3, 2015.
The Eurasian Patent Organization (EAPO), Notification, Eurasian Application No. 201492051/31, (undated but forwarded Sep. 27, 2016 from Eurasian Patent Agent).

* cited by examiner

INVERT EMULSION TRANSITION FLUID CONTAINING CALCIUM ALUMINATE CEMENT

TECHNICAL FIELD

An oil-based transition fluid contains a calcium aluminate cement. The transition fluid can be used in lieu of, or in addition to, a spacer fluid. The transition fluid can be introduced into the wellbore after the introduction of an oil-based drilling fluid and before the introduction of a cement composition. The transition fluid functions to maintain or decrease the setting time of the cement composition and can also enhance some of the properties of the cement composition, such as the compressive strength.

SUMMARY

According to an embodiment, a transition fluid comprises: a hydrocarbon liquid, wherein the hydrocarbon liquid is the external phase of the transition fluid; an aqueous liquid, wherein the aqueous liquid is the internal phase of the transition fluid and wherein the aqueous liquid comprises a water-soluble salt; and a calcium aluminate cement.

According to another embodiment, a method of cementing in a subterranean formation comprises: introducing the transition fluid into the subterranean formation; and introducing a cement composition into the subterranean formation, wherein the step of introducing the cement composition is performed after the step of introducing the transition fluid and wherein the cement composition comprises cement and water.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
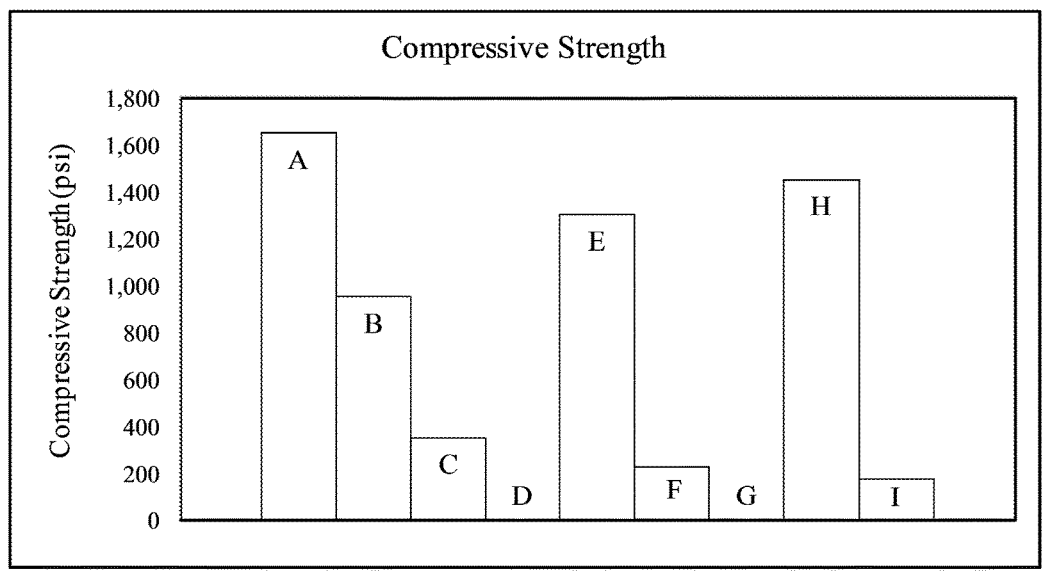
FIG. 1 is a graph of compressive strength in psi for several contaminated cement compositions according to an embodiment.

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, the test transition fluid consists essentially of the hydrocarbon liquid, the aqueous liquid, the calcium aluminate cement, and the surfactant. The fluid can contain other ingredients so long as the presence of the other ingredients does not materially affect the basic and novel characteristics of the claimed invention, i.e., so long as the test fluid has the specified plastic viscosity, etc.

It should also be understood that, as used herein, "first," "second," and "third," are assigned arbitrarily and are merely intended to differentiate between two or more spacer fluids, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. As used herein, the term "emulsion" means a colloid in which an aqueous liquid is the external phase and a hydrocarbon liquid is the internal phase. As used herein, the term "invert emulsion" means a colloid in which a hydrocarbon liquid is the external phase and an aqueous liquid is the internal phase. Of course, there can be more than one internal phase of the emulsion or invert emulsion, but only one external phase. For example, there can be an external phase which is adjacent to a first internal phase, and the first internal phase can be adjacent to a second internal phase. Any of the phases of an emulsion or invert emulsion can contain dissolved materials and/or undissolved solids.

As used herein, a "cement composition" is a mixture of at least cement and water. A cement composition can include additives. As used herein, the term "cement" means an initially dry substance that develops compressive strength or sets in the presence of water. An example of cement is Portland cement and calcium aluminate cement (CAC). CACs generally have a faster setting time compared to conventional hydraulic cements, such as Portland cements. As used herein, the term "set" and all grammatical variations thereof means the process of becoming hard or solid through curing. A cement composition is generally a slurry in which the water is the external phase of the slurry and the cement (and any other insoluble particles) is the internal phase. The external phase of a cement composition can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water producing well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe, and back up the annulus between the wall of the wellbore and the outside of the drilling pipe. The drilling fluid performs various functions, such as cooling the drill bit, maintaining the desired hydrostatic pressure in the well, and carrying drill cuttings upwardly through the annulus between the wellbore and the drilling pipe.

Some subterranean formations can be adversely affected by certain types of drilling fluids. One example of a formation that can be adversely affected by certain types of drilling fluids is a water-sensitive formation. When a drilling fluid is an emulsion, and the water comes in contact with a water-sensitive formation, then the water can adversely affect the subterranean formation. Some of the adverse effects can include swelling or sloughing of the subterranean formation, or gumbo formation.

In order to help minimize some of the adverse effects water can have on a water-sensitive formation, an invert emulsion drilling fluid can be used. An invert emulsion drilling fluid is commonly referred to as an oil-based drilling fluid or oil-based mud. As used herein, the term "oil based" means a fluid having an external phase comprising a hydrocarbon liquid. An oil-based drilling fluid can include a synthetic hydrocarbon liquid. Examples of hydrocarbon liquids used in oil-based drilling fluids include, but are not limited to: a fractional distillate of crude oil; a fatty derivative of an acid, an ester, an ether, an alcohol, an amine, an amide, or an imide; a saturated hydrocarbon (such as an alkane or paraffin); an unsaturated hydrocarbon (such as an internal olefin); a branched hydrocarbon; and a cyclic hydrocarbon. Commercially-available examples of hydrocarbon liquids include, but are not limited to: ENCORE® drilling fluid, BAROID ALKANE™ base fluid, XP-07™ base fluid, and PETROFREE® ESTER base fluid, marketed by Halliburton Energy Services, Inc.; and ESCAID 110™ available from ExxonMobil in Houston, Tex., USA.

Oil-based drilling fluids can provide better shale inhibition, better lubrication, higher rates of penetration, and deeper bit penetration compared to a water-based drilling fluid. Therefore, it is often desirable to use an oil-based drilling fluid as opposed to a water-based drilling fluid.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wall of the wellbore and the outside of the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing or a production tubing string and into the wellhead. Cement compositions can also be used in primary or secondary cementing operations, well-plugging, or squeeze cementing.

It is desirable to remove a drilling fluid completely from a wellbore before a cement composition is introduced into the wellbore. This can be accomplished with the use of a spacer fluid. The spacer fluid can be introduced into the wellbore after the drilling fluid and before the cement composition. The spacer fluid can be circulated down through a drill string or tubing string and up through an annulus. The spacer fluid functions to remove the drilling fluid from the wellbore.

However, oil-based drilling fluids are generally more difficult to remove with a spacer fluid compared to water-based drilling fluids. As a result, it is common for some of the oil-based drilling fluid to remain in the well even after introducing a spacer fluid into the well. The remaining oil-based drilling fluid is commonly referred to as a "mud-pocket". A cement composition can mix with some of the remaining oil-based drilling fluid and become "contaminated." If some of the remaining oil-based drilling fluid mixes with the cement composition, then the drilling fluid can cause adverse effects on some of the properties of the cement composition. For example, the rheology and compressive strength of the cement composition can be adversely affected. Thus, some or all of the cement composition may never set or be significantly delayed in setting.

It has been discovered that an oil-based transition fluid containing a calcium aluminate cement (CAC) can be used in lieu of, or in addition to, a spacer fluid. The transition fluid can be introduced into the wellbore after the introduction of an oil-based drilling fluid and before the introduction of a cement composition. The transition fluid functions to maintain or decrease the setting time of the cement composition and can also enhance some of the properties of the cement composition, such as the compressive strength.

If any test (e.g., rheology or compressive strength) requires the step of mixing, then a cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s).

An oil-based mud (OBM) was obtained from the field. The field mud was mixed for 1 hour (hr) with a dispersator for 30 minutes (min) with a multi-mixer at 12,000 revolutions per minute (rpm) (+/−500 rpm) prior to testing.

A transition fluid is mixed according to the following procedure. A specified OBM, which includes a hydrocarbon liquid and an aqueous internal phase, is added to a mixing container, and the container is then mixed with a multi-mixer maintained at 12,000 rpm (+/−500 rpm) for 15 min. All mixing of the transition fluid and ingredients is conducted at the same mixing speed and for the same mixing duration of 15 min after addition of each of the specified ingredients. Any additional hydrocarbon liquid, additional aqueous internal phase, calcium aluminate cement (CAC), and any other ingredients are added directly to the container and mixed at the speed and duration specified above prior to the addition of each of the next ingredients. After addition of the last ingredient, the transition fluid is mixed for at least 15 min. It is to be understood that the cement composition, OBM, and transition fluid are mixed at ambient temperature and pressure (about 71° F. (22° C.) and about 1 atm (0.1 MPa)).

A "contaminated cement composition" is prepared as follows. An oil-based mud is obtained. The cement composition is mixed. If a transition fluid is to be incorporated into the contaminated cement composition, then the transition fluid is mixed. A specified percentage by volume of the OBM and possibly the transition fluid are mixed with the cement composition using an overhead paddle mixer at 500 rpm (+/−250 rpm) for 5 min. All of the contaminated cement test samples and uncontaminated cement test samples were cured at 90 F (32.2° C.) for 24 hours (hr) unless otherwise specified. It is to be understood that any of the test samples can be tested for a specific test after preparation of the sample. The sample can also be tested for a specific test after static aging of the sample in a static aging cell for 16 hr at a temperature of 250° F. (121.1° C.) and a pressure of 300 pounds force per square inch (psi) (2.1 Megapascals "MPa") consisting of nitrogen gas.

It is to be understood that if any test (e.g., rheology) requires the test be performed at a specified temperature and possibly a specified pressure, then the temperature and pressure of the test composition is adjusted up to the specified temperature and pressure after being mixed at ambient temperature and pressure. For example, a cement composition can be mixed at 71° F. (22° C.) and 1 atm (0.1 MPa) and then placed into the testing apparatus and the temperature of the cement composition can be adjusted to the specified temperature. After the test composition is adjusted to the specified temperature and possibly specified pressure, the test composition is maintained at that temperature and pressure for the duration of the testing.

A desirable property of an oil-based substance is a good electrical stability. The electrical stability (ES) of the substance is a property related to its emulsion stability and oil-wetting capability. ES is determined by applying a voltage-ramped, sinusoidal electrical signal across a pair of parallel, flat-plate electrodes immersed in the drilling fluid. The resulting current remains low until a threshold voltage is reached, whereupon the current rises very rapidly. This threshold voltage is referred to as the ES of the oil-based drilling fluid and is defined as the voltage (in peak volts) measured when the current reaches 61 microamperes (pA). The "electrical stability" of an oil-based substance is measured according to API 13B-2 section 10, Recommended Practice for Field Testing of Oil-based Drilling Fluids procedure as follows. The substance is placed in a viscometer cup maintained at 50° C.±2° C. (120° F.±5° F.). The substance is hand-stirred with an electrode probe for approximately 10 s to ensure that the composition and temperature of the substance are uniform. The electrode probe is positioned such that it does not touch the bottom or sides of the container and the electrode surfaces are completely covered by the substance. The voltage ramp test is conducted. The average of the two ES measurements is the ES reported in units of volts (V).

Rheology is a unit-less measure of how a substance deforms and flows. Rheology includes the substance's elasticity, plasticity, and viscosity. As used herein, the "rheology" of a substance is measured as follows. The substance is mixed. The substance is placed into the test cell of a rotational viscometer, such as a FANN® Model 35 viscometer, fitted with a Bob and Sleeve attachment and a spring number 1. The substance is tested at the specified temperature and ambient pressure, about 1 atm (0.1 MPa). Rheology readings are taken at multiple rpm's, for example, at 600, 300, 200, 100, 6, and 3.

A substance can develop gel strength. As used herein, the "initial gel strength" of a substance is measured according to API 13B-2 section 6.3, Recommended Practice for Field Testing of Oil-based Drilling Fluids as follows. After the rheology testing of the substance is performed, the substance is allowed to sit in the test cell undisturbed for 10 seconds (s). The motor of the viscometer is then started at 3 rpm. The maximum deflection on the dial reading is the gel strength at 10 s in units of pounds per 100 square feet (lb/100 $ft^2$). As used herein, the "10 min gel strength" is measured as follows. After the initial gel strength test has been performed, the substance is allowed to sit undisturbed in the test cell for 10 minutes (min). The motor of the viscometer is then started at 3 rpm. The maximum deflection on the dial reading is the gel strength at 10 min in units of lb/100 $ft^2$.

As used herein, the "plastic viscosity" (PV) of a substance is obtained from the Bingham-Plastic rheological model and calculated as the difference between the 600 rpm and 300 rpm dial readings from the rheology testing, expressed in units of cP.

The yield point (YP) is defined as the value obtained from the Bingham-Plastic rheological model when extrapolated to a shear rate of zero. As used herein, the "yield point" of a substance is calculated as the difference between the plastic viscosity and the 300 rpm dial reading, expressed in units of lb/100 $ft^2$.

A substance can develop compressive strength. By way of example, cement composition compressive strengths can vary from 0 psi to over 10,000 psi (0 to over 69 MPa). Compressive strength is generally measured at a specified time after the substance has been mixed and at a specified temperature and pressure. Compressive strength can be measured, for example, at a time of 24 hours. Compressive strength can be measured by either a destructive method or non-destructive method.

The destructive method mechanically tests the compressive strength of a substance. As used herein, the "compressive strength" of a substance is measured at ambient temperature (about 71° F., about 22° C.) as follows. The substance is mixed. The substance is then placed into a test cell for at least 24 hours at a temperature of 90° F. (32.2° C.) until the substance has set. The set substance is then removed from the test cell and the set substance is then placed into a compression-testing device, such as a Carver Press testing machine model 4350 L, available from Carver Inc. in Indiana, USA. The pressure is gradually increased until the substance breaks. The destructive compressive strength is calculated as the force required to break the substance divided by the smallest cross-sectional area in contact with the load-bearing plates of the compression-testing device. The destructive compressive strength is reported in units of pressure, such as pound-force per square inch (psi) or megapascals (MPa).

According to an embodiment, a transition fluid comprises: a hydrocarbon liquid, wherein the hydrocarbon liquid is the external phase of the transition fluid; an aqueous liquid, wherein the aqueous liquid is the internal phase of the transition fluid and wherein the aqueous liquid comprises a water-soluble salt; and a calcium aluminate cement.

According to another embodiment, a method of cementing in a subterranean formation comprises: introducing the transition fluid into the subterranean formation; and introducing a cement composition into the subterranean formation, wherein the step of introducing the cement composition is performed after the step of introducing the transition fluid and wherein the cement composition comprises cement and water.

It is to be understood that the discussion of preferred embodiments regarding the transition fluid, the cement composition, etc., or any ingredients thereof, are intended to apply to the composition embodiments and the method embodiments. Any reference to the unit "gallons" means U.S. gallons.

The transition fluid comprises a hydrocarbon liquid, wherein the hydrocarbon liquid is the external phase of the transition fluid. The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include, ENCORE® drilling fluid and ACCOLADE® internal olefin and ester blend drilling fluid, marketed by Halliburton Energy Services, Inc. An example of a diesel oil-based drilling fluid is INVER-MUL®, marketed by Halliburton Energy Services, Inc.

The transition fluid includes an aqueous liquid. The aqueous liquid is the internal phase of the transition fluid. There can also be more than one internal phase of the transition fluid. The aqueous liquid comprises water and a water-soluble salt. The aqueous liquid can be selected from the group consisting of freshwater, brackish water, and saltwater, in any combination thereof in any proportion. The salt for the aqueous liquid can be selected from the group consisting of sodium chloride, calcium chloride, calcium bromide, potassium chloride, potassium bromide, magnesium chloride, and any combination thereof in any proportion. Preferably, the salt is in a concentration in the range of about 15% to about 40% by weight of the water. The salt can also be in a concentration such that the aqueous liquid has a water phase salinity in the range of about 100,000 to about 400,000 parts per million (ppm), preferably about 150,000 to about 300,000 ppm.

The salt can also be in a concentration such that the amount of available free water is in a desired amount. The desired amount of free water available can be an amount whereby the least amount of calcium aluminate cement (CAC) chemically reacts with the free water. In this manner, during introduction of the transition fluid into the subterranean formation, the CAC does not begin to thicken or begin to set. It is to be understood that some of the CAC may begin to chemically react with the water of the aqueous liquid, but preferably the amount that reacts is not so significant that introduction is impaired via the reaction. As such, according to an embodiment, the transition fluid is in a pumpable state during the step of introducing the transition fluid into the subterranean formation.

The salt can also be in a concentration such that the transition fluid has a desired density. According to an embodiment, the desired density is a density similar to the density of a drilling fluid used in forming a wellbore in the subterranean formation. As used herein, the term "similar" means within +/−10%. According to another embodiment, the desired density is in the range of about 8 to about 20 pounds per gallon (ppg) (about 0.959 to about 2.397 kilograms per liter "kg/L"), preferably about 10 to about 16 ppg (about 1.198 to about 1.917 kg/L).

The transition fluid includes calcium aluminate cement (CAC). The CAC comprises at least calcium, aluminum, and oxygen. According to an embodiment, the CAC comprises aluminum oxide ($Al_2O_3$) and calcium oxide (CaO). The CAC can also include silicon dioxide ($SiO_2$), iron III oxide ($Fe_2O_3$), and other minerals. The aluminum oxide can be present in the CAC in an amount in the range of about 30 weight (wt.) % to about 80 wt. %, alternatively from about 40 wt. % to about 70 wt. %, or alternatively from about 50 wt. % to about 60 wt. %, based upon the total weight of the CAC. The calcium oxide can be present in the CAC in an amount in the range of about 20 wt. % to about 60 wt. %, alternatively from about 30 wt. % to about 50 wt. %, or alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1. An example of a commercially-available calcium aluminate cement is THERMAL-OCK™, marketed by Halliburton Energy Services, Inc. and SECAR® 51, available from Kerneos Inc. in Chesapeake, Va.

According to an embodiment, the CAC is in a sufficient concentration such that the transition fluid is capable of providing a compressive strength of at least 900 psi (6.2 MPa) to a contaminated cement composition comprising cement and water, and having 10% by volume contamination with the transition fluid at a curing temperature of 90° F. (32.2° C.) and a time of at least 24 hours. According to another embodiment, the CAC is in a concentration of at least 25 pounds per barrel (ppb) of the transition fluid. The CAC can also be in concentration in the range of about 25 to about 200 ppb, preferably about 50 to about 150 ppb of the transition fluid.

The transition fluid can further comprise a surfactant. A surfactant is amphiphilic, comprising a hydrophobic tail group and a hydrophilic head group. If a surfactant is in a sufficient concentration in a solution, then the surfactant molecules can form micelles. A "micelle" is an aggregate of surfactant molecules dispersed in a solution. A surfactant in an oil solution can form reverse-micelles with the hydrophobic tails in contact with the hydrocarbon solvent, sequestering the hydrophilic heads in the center of the reverse-micelle. Conversely, a surfactant in an aqueous solution can form micelles with the hydrophilic heads in contact with the aqueous solvent, sequestering the hydrophobic tails in the micelle center. The surfactant must be in a sufficient concentration to form a reverse-micelle or micelle, known as the critical micelle concentration (CMC). The critical micelle concentration is the concentration of surfactant above which reverse-micelles or micelles are spontaneously formed.

According to an embodiment, the surfactant is a water-wetting agent. Thus, if included in the transition fluid at or above the CMC, then the surfactant is capable of forming micelles. According to another embodiment, the surfactant is capable of decreasing the plastic viscosity of the transition fluid compared to a transition fluid without the surfactant. The surfactant can also be capable of decreasing the 10 s and 10 min gel strength of the transition fluid. Preferably, the surfactant does not delay the setting time of the cement composition. Commercially-available suitable surfactants are ENVIROGEM® 360 and ENVIROGEM® 2010, hydroxy thioether-based gemini surfactants, available from Air Products and Chemicals, Inc. in Allentown, Pa.

According to an embodiment, the surfactant has a concentration greater than or equal to the critical micelle concentration. According to another embodiment, the surfactant is in a concentration such that a test transition fluid consisting essentially of the hydrocarbon liquid, the aqueous liquid, the CAC, and the surfactant, and in the same proportions as the transition fluid has a lower plastic viscosity (PV) than a substantially identical test transition fluid without the surfactant when tested at a temperature of 120° F. (48.9° C.). As used herein, the phrase "substantially identical" means the fluid contains the same ingredients, concentrations of ingredients, etc. with the exception of the ingredient specifically excluded. The surfactant can also be in a concentration such that the 10 s and 10 min gel strength of the test transition fluid is decreased. The surfactant can also be in a sufficient concentration such that the transition fluid has a desired PV. The desired PV can be in the range of about 10 to about 150 centipoise (cP), preferably about 35 to about 85 cP. The desired PV can also be a PV such that the transition fluid remains in a pumpable state during introduction into the subterranean formation. According to an embodiment, the surfactant is in a concentration of at least 0.10 pounds per barrel (lb/bbl) of the transition fluid. The surfactant can also be in a concentration in the range of about 0.10 to about 20 lb/bbl of the transition fluid, preferably about 5 to about 10 lb/bbl of the transition fluid.

According to an embodiment, the transition fluid has a plastic viscosity in the range of about 10 to about 150 centipoise (cP), preferably about 35 to about 85 cP, at the bottomhole temperature and pressure of the subterranean formation. As used herein, the term "bottomhole" means the portion of the subterranean formation to be treated. According to another embodiment, the transition fluid has a density in the range of about 8 to about 20 pounds per gallon (ppg) (about 0.959 to about 2.397 kilograms per liter "kg/L"), preferably about 10 to about 16 ppg (about 1.198 to about 1.917 kg/L), at the bottomhole temperature and pressure of the subterranean formation. According to an embodiment, the transition fluid is in a pumpable state during introduction into the subterranean formation. As used herein, the "pumpability" of a fluid is related to the consistency of the fluid. Generally, a fluid is considered pumpable if the fluid has a consistency of less than or equal to 70 Bearden units of consistency (Bc). According to another embodiment, the transition fluid has a consistency less than or equal to 70 Bc during introduction into the formation. The thickening time of a fluid is the time it takes for a fluid to reach greater than 70 Bc. According to yet another embodiment, the transition fluid has a thickening time of at least 30 min, preferably at least 1 hour, and more preferably the time it takes to introduce the transition fluid into the portion of the subterranean formation. The CAC of the transition fluid can be encapsulated such that the transition fluid remains pumpable and has the desired thickening time. The encapsulating material can be designed such that the material dissolves at a pre-determined time.

The transition fluid can also contain other ingredients. The other ingredients can include a friction reducer, a strength-retrogression additive, a light-weight additive, a defoaming agent, a high-density additive, a mechanical property enhancing additive, a lost-circulation material, a filtration-control additive, a thixotropic additive, and combinations thereof.

The methods include the step of introducing the transition fluid into the subterranean formation. The methods can further include the step of forming the transition fluid. The step of forming can include preparing the transition fluid on-the-fly at a well site. The methods can further include the step of introducing an oil-based drilling fluid into the subterranean formation, wherein the step of introducing the oil-based drilling fluid is performed prior to the step of introducing the transition fluid. According to an embodiment, the transition fluid has a density similar to the oil-based drilling fluid. According to another embodiment, the density of the oil-based drilling fluid is less than the necessary density such that premature fracturing of the subterranean formation could occur. According to another embodiment, the transition fluid has a plastic viscosity similar to the oil-based drilling fluid. The step of forming the transition fluid can also include obtaining a volume of the oil-based drilling fluid and mixing the CAC; possibly the surfactant, additional hydrocarbon liquid, and additional aqueous internal phase; and any other ingredients with the oil-based drilling fluid. According to this embodiment, the oil-based drilling fluid comprises at least a portion of the hydrocarbon liquid external phase and the aqueous liquid internal phase.

The methods can further include the step of introducing a spacer fluid into the subterranean formation. The step of introducing the spacer fluid can be performed before or after the introduction of the transition fluid. More than one spacer fluid can also be introduced into the subterranean formation. According to this embodiment, a first spacer fluid can be introduced before the transition fluid and a second spacer fluid can be introduced after the transition fluid. Preferably, the spacer fluid is introduced after the introduction of the oil-based drilling fluid. Preferably, the spacer fluid is introduced prior to the step of introducing the cement composition.

The methods include the step of introducing the cement composition into the subterranean formation, wherein the step of introducing the cement composition is performed after the step of introducing the transition fluid. The cement composition can be in a pumpable state before and during introduction into the subterranean formation.

For any of the fluids and compositions, the subterranean formation can be a reservoir or adjacent to a reservoir. The subterranean formation can be penetrated by a well. The step of introducing the fluids and composition can include introducing the fluids or composition into the well. The well can be without limitation, an oil, gas, or water production well, or an injection well. The step of introducing the cement composition can be for the purpose of at least one of the following: well completion, primary or secondary cementing operations, well-plugging, squeeze cementing, or gravel packing operations.

The cement composition comprises cement. The cement can be Class A cement, Class C cement, Class G cement, Class H cement, and any combination thereof. Preferably, the cement is Class G cement or Class H cement. The cement can be, without limitation, Portland cement, Joppa cement, Dyckerhoff cement, and any combination thereof. The cement can also be a calcium aluminate cement.

The cement composition also includes water. The water can be selected from the group consisting of freshwater, brackish water, and saltwater, in any combination thereof in any proportion. The cement composition can further comprise a water-soluble salt. The salt can be selected from sodium chloride, calcium chloride, calcium bromide, potassium chloride, potassium bromide, magnesium chloride, and any combination thereof in any proportion. Preferably, the salt is in a concentration in the range of about 15% to about 40% by weight of the water.

According to an embodiment, the cement composition has a density of at least 8 ppg (0.959 kg/L). The cement composition can have a density in the range of about 8 to about 22 ppg (about 0.959 to about 2.636 kg/L).

The cement composition can further include other additives. Examples of other additives include, but are not limited to, a filler, a fluid loss additive, a set retarder, a friction reducer, a set accelerator, a thinner, a strength-retrogression additive, a light-weight additive, a defoaming agent, a high-density additive, a mechanical property enhancing additive, a lost-circulation material, a filtration-control additive, a thixotropic additive, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwoc).

The cement composition can include a fluid loss additive. Suitable examples of commercially-available fluid loss additives include, but are not limited to, and are marketed by Halliburton Energy Services, Inc. under the tradenames HALAD®-344, HALAD®-413, and HALAD®-300. Preferably, the fluid loss additive is in a concentration in the range of about 0.05% to about 10% bwoc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. Preferably, the set retarder is in a concentration in the range of about 0.05% to about 10% bwoc.

The cement composition can include a friction reducer. Suitable examples of commercially-available friction reducers include, but are not limited to, and are marketed by Halliburton Energy Services, Inc. under the tradenames CFR-2™, CFR-3™, CFR-5LE™, CFR-6™, and CFR-8™. Preferably, the friction reducer is in a concentration in the range of about 0.1% to about 10% bwoc.

The cement composition can include a strength-retrogression additive. Suitable examples of commercially-available strength-retrogression additives include, but are not limited to, and are marketed by Halliburton Energy Services, Inc. under the tradenames SSA-1™ and SSA-2™. Preferably, the strength-retrogression additive is in a concentration in the range of about 5% to about 50% bwoc.

The cement composition can include a light-weight additive. Suitable examples of commercially-available light-weight additives include, but are not limited to, and are marketed by Halliburton Energy Services, Inc. under the tradenames SPHERELITE® and LUBRA-BEADS® FINE; and available from 3M in St. Paul, Minn. under the tradenames HGS2000™, HGS3000™, HGS4000™, HGS5000™, HGS6000™, HGS10000™, and HGS18000™ glass bubbles. Preferably, the light-weight additive is in a concentration in the range of about 5% to about 50% bwoc.

Commercially-available examples of other additives include, but are not limited to, HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers, marketed by Halliburton Energy Services, Inc.

The methods can further include the step of allowing the cement composition to set. The step of allowing can be performed after the step of introducing the cement composition into the subterranean formation. The method embodiments can further include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

The transition fluids contained a drilling base fluid in units of barrels (bbl) containing diesel oil as the hydrocarbon liquid external phase and a calcium chloride brine at a water phase salinity concentration of 250,000 parts per million (ppm) as the aqueous liquid in varying oil-to-water ratios (OWR). The drilling base fluid also contained other ingredients, such as an emulsifier, a filtration control agent, a viscosifier, and barite. Fluids 2, 3, and 4 also contained SECAR® 51 calcium aluminate cement at a concentration of 100 pounds per barrel (lb/bbl). Fluid D also contained ENVIROGEM® 360 surfactant at a concentration of 10 lb/bbl. The density for each fluid is listed in units of pounds per gallon (lb/gal).

Unless stated otherwise, all of the transition fluids were mixed and tested according to the procedure for the specific test as described in The Detailed Description section above. The "base" fluid data was conducted before static aging. The "aged" fluid data was conducted after static aging the sample for 16 hours at a temperature of 250° F. (121.1° C.) and a pressure of 300 psi (2.1 MPa) consisting of nitrogen gas. The rheology and electrical stability (ES) tests were conducted at a pressure of 1 atm and a temperature of 120° F. (48.9° C.).

Table 1 contains electrical stability (ES), plastic viscosity (PV), yield point (YP), 10 second (s) and 10 minute (min) gel strengths, and rheology data for test fluids A through D base fluid and aged fluid.

TABLE 1

| | Fluid | | | | | | | |
|---|---|---|---|---|---|---|---|---|
| | 1 | | 2 | | 3 | | 4 | |
| | Base | Aged | Base | Aged | Base | Aged | Base | Aged |
| Drilling Base Fluid (bbl) | 1 | 1 | 1 | 1 | 0.73 | 0.73 | 0.73 | 0.73 |
| SECAR ® 51 (lb/bbl) | 0 | 0 | 100 | 100 | 100 | 100 | 100 | 100 |
| ENVIROGEM ® 360 | 0 | 0 | 0 | 0 | 0 | 0 | 10 | 10 |
| Density (lb/gal) | 13.7 | 13.7 | | 15.3 | | 14.2 | | 14.3 |
| OWR | 81/19 | 82/18 | | 81/19 | 80/20 | | 83/17 | |
| ES (V) | 597 | 466 | >2,048 | 466 | 1,276 | | 552 | 818 |
| PV (cP) | 36 | 35 | 51 | 77 | 33 | | 34 | 38 |
| YP (lb/100 sq. ft.) | 9 | 11 | 15 | 18 | 6 | | 3 | 5 |
| 10 s/10 min gel strength | 11/21 | 12/26 | 15/32 | 9/34 | 7/14 | 10/23 | 4/7 | 5/9 |
| 600 rpm | 81 | 81 | 117 | 172 | 72 | Off Scale | 71 | 81 |
| 300 rpm | 45 | 46 | 66 | 95 | 39 | 171 | 37 | 43 |
| 200 rpm | 34 | 34 | 48 | 68 | 28 | 121 | 26 | 31 |
| 100 rpm | 21 | 21 | 29 | 39 | 16 | 64 | 15 | 17 |
| 6 rpm | 6 | 7 | 8 | 7 | 5 | 9 | 4 | 4 |
| 3 rpm | 5 | 6 | 7 | 6 | 4 | 7 | 3 | 3 |

As can be seen in Table 1, fluid 1 exhibited very good results. Fluid 2, containing the CAC, exhibited higher viscosity compared to Fluid 1. Fluid 3 exhibited a lower ES for the base and aged fluids and lower PV, YP, gel strengths, and rheology for the base fluid compared to Fluid 2. However, the rheology of Fluid 3 dramatically increased after aging. Fluid 4 exhibited better than or comparable results to Fluid 1. This indicates that the addition of the surfactant to the transition fluid yields a transition fluid that has similar properties to a traditional invert emulsion. Fluid 4 also exhibited better results for the aged fluid compared to the aged Fluid 2 and 3.

For the Figures, the cement compositions, drilling fluids, transition fluids, and contaminated cement compositions were mixed and tested according to the procedure for the specific test as described in The Detailed Description section above. Compressive strength testing was performed after static aging of the cement compositions and contaminated cement compositions for at least 24 hours for all of the composition that set at a temperature of 90° F. (32.2° C.). If after 24 hours, the composition had not set, the sample was allowed to cure for an additional 24 hours. Table 2 lists the ingredients of each of the contaminated cement compositions and the ratios of the ingredients by volume for FIG. 1. The cement compositions contained 860 grams (g) Class H cement and 327 g deionized water. The drilling base fluids contained diesel oil as the hydrocarbon liquid external phase at a concentration of 36 lb/bbl and a calcium chloride brine at a water phase salinity concentration of 250,000 parts per million (ppm) as the aqueous liquid internal phase at a concentration of 12 lb/bbl. The drilling base fluids also contained other ingredients, such as an emulsifier, a filtration control agent, a viscosifier, and Barite. The transition fluids contained 0.73 barrels of the drilling base fluid along with SECAR® 51 calcium aluminate cement at a concentration of 100 pounds per barrel (lb/bbl), and ENVIROGEM® 360 surfactant at a concentration of 10 lb/bbl for compositions E, F, and G, and ENVIROGEM® 2010 surfactant at a concentration of 10 lb/bbl for compositions H and I.

TABLE 2

| | Cement Composition (% by volume) | Drilling Base Fluid (% by volume) | Transition Fluid (% by volume) |
|---|---|---|---|
| A | 100 | | |
| B | 90 | 10 | |

TABLE 2-continued

| | Cement Composition (% by volume) | Drilling Base Fluid (% by volume) | Transition Fluid (% by volume) |
|---|---|---|---|
| C | 70 | 30 | |
| D | 50 | 50 | |
| E | 90 | | 10 |
| F | 70 | | 30 |
| G | 50 | | 50 |
| H | 90 | | 10 |
| I | 50 | | 50 |

As can be seen in FIG. 1, composition A represents a traditional cement slurry having a compressive strength of 1,650 psi (11.4 MPa). Compositions B, C, and D represent a cement composition that is contaminated with an oil-based drilling fluid. As can be seen, as the percentage of oil-based drilling fluid contamination increases, the compressive strength of the contaminated cement composition decreases. At a contamination ratio of 50:50 (composition D), the contaminated cement composition never set. Compositions E through I represent a cement composition that is contaminated with the transition fluid. As can be seen when comparing compositions B, E, and H (each representing a 90:10 contamination ratio), the cement compositions contaminated with the transition fluid (E and H) exhibited much higher compressive strengths compared to the cement composition contaminated with the drilling base fluid (B). This indicates that the presence of the calcium aluminate cement in the transition fluid is capable of increasing the compressive strength of the contaminated cement composition. Moreover, at higher ratios of contamination, the concentration of the CAC may need to be increased in order to provide higher compressive strengths to the contaminated cement composition.

Figure 2:
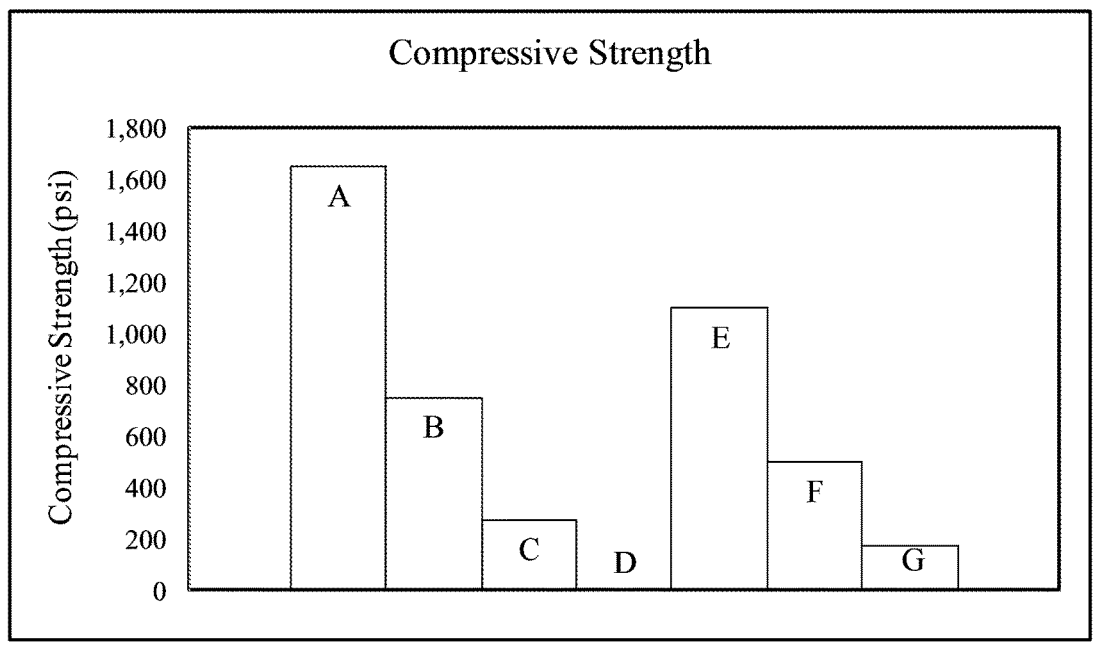
FIG. 2 is a graph of compressive strength in psi for several contaminated cement compositions according to other embodiments.

Table 3 lists the ingredients of each of the contaminated cement compositions and the ratios of the ingredients by volume for FIG. 2. The cement compositions contained 860 grams (g) Class H cement and 327 g deionized water. The drilling base fluids contained an internal olefin as the hydrocarbon liquid external phase at a concentration of 62 lb/bbl and a calcium chloride brine at a water phase salinity concentration of 250,000 parts per million (ppm) as the aqueous liquid internal phase at a concentration of 47 lb/bbl. The drilling base fluid also contained other ingredients, such as an emulsifier, a filtration control agent, a viscosifier, and barite. The transition fluids contained 0.57 barrels of the drilling base fluid along with SECAR® 51 calcium aluminate cement at a concentration of 100 pounds per barrel (lb/bbl).

TABLE 3

| | Cement Composition (% by volume) | Drilling Base Fluid (% by volume) | Transition Fluid (% by volume) |
|---|---|---|---|
| A | 100 | | |
| B | 90 | 10 | |
| C | 70 | 30 | |
| D | 50 | 50 | |
| E | 90 | | 10 |
| F | 70 | | 30 |
| G | 50 | | 50 |

As can be seen in FIG. 2, composition A represents a traditional cement slurry with a compressive strength of 1,650 psi (11.4 MPa). Compositions B, C, and D represent a cement composition that is contaminated with an oil-based drilling fluid. As can be seen, as the percentage of oil-based drilling fluid contamination increases, the compressive strength of the contaminated cement composition decreases. At a contamination ratio of 50:50 (composition D), the contaminated cement composition never set. Compositions E, F, and G represent a cement composition that is contaminated with the transition fluid. As can be seen when comparing compositions B and E, and C and F, the cement compositions contaminated with the transition fluid (E and F) exhibited much higher compressive strengths compared to the cement compositions contaminated with the drilling base fluid (B and C). This indicates that the presence of the calcium aluminate cement in the transition fluid is capable of increasing the compressive strength of the contaminated cement composition. Moreover, the transition fluid functions well to increase compressive strength in both diesel oil and an internal olefin hydrocarbon liquid. This indicates that the transition fluid can be easily formulated based on different types of oil-based drilling fluids being used at a well site.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" "consist of" the various components and steps. Whenever a numerical range with a lower limit and an upper limit is disclosed, any number and any included range falling within the range is specifically disclosed. In particular, every range of various components or steps, the compositions and methods also can "consist essentially of" or values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
    introducing a transition fluid into the subterranean formation, wherein the transition fluid is an invert emulsion and comprises:
        a hydrocarbon liquid, wherein the hydrocarbon liquid is the external phase of the transition fluid;
        an aqueous liquid, wherein the aqueous liquid is the internal phase of the transition fluid and wherein the aqueous liquid comprises a water-soluble salt, wherein the salt is in a concentration such that the aqueous liquid has a water phase salinity in the range of 150,000 to 300,000 parts per million and the salt has a concentration so that the transition fluid has a density within +/−10% of a drilling fluid used in forming a wellbore in the subterranean formation and the transition fluid has a density in the range of 12 ppg to 20 ppg;
        a calcium aluminate cement, wherein the calcium aluminate cement is in a concentration in the range of 25 to 110 pounds per barrel of the transition fluid; and
        a surfactant in a concentration in the range of about 5 to about 20 pounds per barrel of the transition fluid, wherein the surfactant is a hydroxyl thioether-based gemini surfactant; and
    introducing a cement composition into the subterranean formation, wherein the step of introducing the cement composition is performed after the step of introducing the transition fluid and wherein the cement composition comprises cement and water; and contacting at least a portion of the cement composition with the transition fluid to provide a contaminated cement composition in the subterranean formation, wherein the contaminated cement composition comprises at least a 20% increase in compressive strength compared to the same cement composition contaminated with a fluid comprising the same hydrocarbon liquid and aqueous liquid of the transition fluid, but which does not comprise the same surfactant and the calcium aluminate cement of the transition fluid, and wherein the contamination is 10% by volume of the cement composition.

2. The method according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The method according to claim 1, wherein the aqueous liquid is selected from the group consisting of brackish water and saltwater, in any combination thereof in any proportion.

4. The method according to claim 1, wherein the salt for the aqueous liquid is selected from the group consisting of sodium chloride, calcium chloride, calcium bromide, potassium chloride, potassium bromide, magnesium chloride, and any combination thereof in any proportion.

5. The method according to claim 1, wherein the calcium aluminate cement is in a sufficient concentration such that the transition fluid is capable of providing a compressive strength of at least 900 psi (6.2 MPa) to a contaminated cement composition comprising cement and water, and having 10% by volume contamination with the transition fluid at a curing temperature of 90° F. (32.2° C.) and a time of at least 24 hours.

6. The method according to claim 5, wherein the surfactant is a water-wetting agent.

7. The method according to claim 5, wherein the surfactant is capable of decreasing the plastic viscosity of the transition fluid compared to a transition fluid without the surfactant.

8. The method according to claim 5, wherein the surfactant is in a concentration such that a test transition fluid consisting essentially of the hydrocarbon liquid, the aqueous liquid, the calcium aluminate cement, and the surfactant, and in the same proportions as the transition fluid has a lower plastic viscosity than a substantially identical test transition fluid without the surfactant when tested at a temperature of 120° F. (48.9° C.).

9. The method according to claim 5, wherein the surfactant is in a concentration in the range of 10 to 20 pounds per barrel of the transition fluid.

10. The method according to claim 5, wherein the transition fluid has a plastic viscosity in the range of 10 to 150 centipoise at the bottomhole temperature and pressure of the subterranean formation.

11. The method according to claim 5, further comprising the step of introducing an oil-based drilling fluid into the subterranean formation, wherein the step of introducing the oil-based drilling fluid is performed prior to the step of introducing the transition fluid.

12. The method according to claim 11, wherein the transition fluid has a density similar to the oil-based drilling fluid.

13. The method according to claim 11, wherein the transition fluid has a plastic viscosity similar to the oil-based drilling fluid.

14. The method according to claim 5, further comprising the step of introducing a spacer fluid into the subterranean formation, wherein the step of introducing the spacer fluid is performed before or after the step of introducing the transition fluid.

15. The method according to claim 5, further comprising the step of allowing the cement composition to set, wherein the step of allowing is performed after the step of introducing the cement composition into the subterranean formation.

16. The method of claim 5 wherein the surfactant is of sufficient concentration to spontaneously form a reverse-micelle or micelle.

17. A method of cementing in a subterranean formation comprising:

introducing a transition fluid into the subterranean formation, wherein the transition fluid is an invert emulsion and comprises:

a hydrocarbon liquid, wherein the hydrocarbon liquid is the external phase of the transition fluid;

an aqueous liquid, wherein the aqueous liquid is the internal phase of the transition fluid and wherein the aqueous liquid comprises a water-soluble salt, wherein the salt is in a concentration such that the aqueous liquid has a water phase salinity in the range of 150,000 to 300,000 parts per million and the salt has a concentration so that the transition fluid has a density within +/−10% of a drilling fluid used in forming a wellbore in the subterranean formation and the transition fluid has a density in the range of 12 ppg to 20 ppg;

a calcium aluminate cement, wherein the calcium aluminate cement is in a concentration in the range of 25 to 110 pounds per barrel of the transition fluid; and a surfactant in a concentration in the range of about 5 to about 20 pounds per barrel of the transition fluid, wherein the surfactant is a hydroxyl thioether-based gemini surfactant; and introducing a cement composition into the subterranean formation, wherein the step of introducing the cement composition is performed after the step of introducing the transition fluid and wherein the cement composition comprises cement and water; and contacting at least a portion of the cement composition with the transition fluid to provide a contaminated cement composition in the subterranean formation, wherein the contamination is 10% by volume of the cement composition, and wherein the contaminated cement composition has a compressive strength of greater that 1200 psi (6.9 MPa) at a curing temperature of 90° F. (32.2° C.) and a time of at least 24 hours.

18. A method of cementing in a subterranean formation comprising:

introducing a transition fluid into the subterranean formation, wherein the transition fluid is an invert emulsion and comprises:

a hydrocarbon liquid, wherein the hydrocarbon liquid is the external phase of the transition fluid;

an aqueous liquid, wherein the aqueous liquid is the internal phase of the transition fluid and wherein the aqueous liquid comprises a water-soluble salt, wherein the salt is in a concentration such that the aqueous liquid has a water phase salinity in the range of 150,000 to 300,000 parts per million and the salt has a concentration so that the transition fluid has a density within +/−10% of a drilling fluid used in forming a wellbore in the subterranean formation and the transition fluid has a density in the range of 12 ppg to 20 ppg;
a calcium aluminate cement; wherein the calcium aluminate cement is in a concentration in the range of 25 to 110 pounds per barrel of the transition fluid; and
a surfactant in a concentration in the range of about 5 to about 20 pounds per barrel of the transition fluid, wherein the surfactant is a hydroxyl thioether-based gemini surfactant; and introducing a cement composition into the subterranean formation, wherein the step of introducing the cement composition is performed after the step of introducing the transition fluid and wherein the cement composition comprises cement and water; and contacting at least a portion of the cement composition with the transition fluid to provide a contaminated cement composition in the subterranean formation; wherein the contamination is 10% by volume of the cement composition, and wherein the contaminated cement composition has a compressive strength decrease of less than 25% compared to the uncontaminated cement composition at a curing temperature of 90° F. (32.2° C.) and a time of at least 24 hours.

* * * * *